US012790021B2

(12) United States Patent
Fink et al.

(10) Patent No.: US 12,790,021 B2
(45) Date of Patent: Nov. 10, 2026

(54) ROTARY-WING AIRCRAFT WITH AT LEAST ONE ATTACHMENT INTERFACE

(71) Applicant: AIRBUS HELICOPTERS DEUTSCHLAND GMBH, Donauwörth (DE)

(72) Inventors: Axel Fink, Donauwörth (DE); Gerhard Hoffmann, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 163 days.

(21) Appl. No.: 18/966,784

(22) Filed: Dec. 3, 2024

(65) Prior Publication Data

US 2025/0333187 A1 Oct. 30, 2025

(30) Foreign Application Priority Data

Apr. 26, 2024 (EP) .................................... 24172669

(51) Int. Cl.
*B64D 47/00* (2006.01)
*B64C 27/50* (2006.01)
*F16M 11/14* (2006.01)

(52) U.S. Cl.
CPC .............. *B64D 47/00* (2013.01); *B64C 27/50* (2013.01); *F16M 11/14* (2013.01)

(58) Field of Classification Search
CPC .......... B60D 1/06; B60D 1/065; B64C 27/50; B64D 47/00
See application file for complete search history.

(56) References Cited

U.S. PATENT DOCUMENTS 2,189,710 A * 2/1940 Draeger ................. B60D 1/065 280/511
4,301,982 A * 11/1981 Tiemann ................. B64C 27/50 244/17.11

(Continued)

FOREIGN PATENT DOCUMENTS

EP 4541713 A1 4/2025

OTHER PUBLICATIONS

European Search Report for European Application No. EP 24172669.4, Completed by the European Patent Office, Dated Sep. 3, 2024, 7 pages.

(Continued)

*Primary Examiner* — Joshua J Michener
*Assistant Examiner* — Michael B. Kreiner
(74) *Attorney, Agent, or Firm* — BROOKS KUSHMAN P.C.

(57) ABSTRACT

A rotary-wing aircraft, comprising: an airframe with an airframe skin that forms an outer airframe loft line and encloses an airframe inner volume, wherein the airframe skin comprises at least one airframe opening; and at least one attachment interface that is mounted to the airframe skin at the airframe opening and configured for a releasable attachment of an external device, wherein the at least one attachment interface comprises an interface cap with a mounting flange that is rigidly attached to the airframe skin, wherein the interface cap comprises at least one pocket that forms a pocket base; and a ball stud with a stud shaft and a ball, wherein the ball stud is rigidly attached to the pocket base and extends at least partly into the airframe opening.

15 Claims, 8 Drawing Sheets

(56) References Cited

U.S. PATENT DOCUMENTS

| | | | | |
|---|---|---|---|---|
| 4,623,300 | A | 11/1986 | Ruzicka | |
| 5,513,869 | A * | 5/1996 | Putnam | B60D 1/065 280/901 |
| 6,769,644 | B2 * | 8/2004 | Muylaert | B64C 27/50 244/17.11 |
| 7,207,519 | B2 * | 4/2007 | Hoynash | B64C 27/50 248/598 |
| 7,661,694 | B2 * | 2/2010 | Krespach | B60D 1/06 280/511 |
| 8,636,250 | B2 * | 1/2014 | Toni | B64D 1/22 244/137.4 |
| 9,050,868 | B2 * | 6/2015 | Schott | B60D 1/065 |
| 9,421,673 | B2 * | 8/2016 | Dunmire | B64C 27/50 |
| 9,466,269 | B2 * | 10/2016 | Brown, Jr. | G10H 1/32 |
| 10,625,866 | B2 | 4/2020 | Emrich et al. | |
| 10,745,147 | B2 * | 8/2020 | Lafon | B64D 47/00 |
| 11,117,667 | B1 | 9/2021 | McGann et al. | |
| 11,117,673 | B2 * | 9/2021 | Tudor | B64D 25/14 |
| 11,325,696 | B2 * | 5/2022 | Suzuki | B64C 13/20 |
| 2005/0211825 | A1 | 9/2005 | Hoynash | |
| 2008/0213034 | A1 | 9/2008 | Wood et al. | |
| 2012/0018569 | A1 * | 1/2012 | Toni | B64C 1/061 244/17.11 |
| 2021/0107621 | A1 | 4/2021 | Whitmer et al. | |
| 2025/0121956 | A1 * | 4/2025 | Fink | B64C 27/50 |

OTHER PUBLICATIONS

Communication Pursuant to Article 94(3) EPC for European Application No. EP 24172669.4, Completed by the European Patent Office, Dated Jun. 17, 2026, 4 pages.

* cited by examiner

ROTARY-WING AIRCRAFT WITH AT LEAST ONE ATTACHMENT INTERFACE

CROSS-REFERENCE TO RELATED APPLICATIONS

This application claims priority to European patent application No. EP 24172669.4 filed on Apr. 26, 2024, the disclosure of which is incorporated in its entirety by reference herein.

TECHNICAL FIELD

The present technology relates to a rotary-wing aircraft, comprising an airframe with an airframe skin that forms an outer airframe loft line and encloses an airframe inner volume, wherein the airframe skin comprises at least one airframe opening. The rotary-wing aircraft further comprises at least one attachment interface that is mounted to the airframe skin at the airframe opening and configured for a releasable attachment of an external device.

BACKGROUND

In general, attachment interfaces for attachment of external devices to or in rotary-wing aircrafts are well-known. For instance, the document U.S. Pat. No. 10,625,866 B2 describes attachment interfaces for attachment of passenger seats to a floor panel of a rotary-wing aircraft. A respective attachment interface includes a puck that is formed using two vertically arranged cup-shaped portions. Each cup-shaped portion includes a flange, and the two flanges are located internally and adjacent to each other when the puck is embedded within a hole drilled in the floor panel. Each flange includes a ridge that provides structural support and strength when the puck is embedded in the hole by having the ridges clamp the floor panel. A stud is oriented perpendicular to the floor panel to be screwed into the flat inner flanges and for attachment of passenger seats. The stud is hidden within the hole in the floor panel which has a comparatively great thickness.

Furthermore, attachment interfaces may be implemented in composite sandwich shells which are characterized by the use of thin composite face sheets and honeycomb cores, wherein a total thickness of a given shell typically ranges between 10 mm and 20 mm. Such attachment interfaces are often characterized by the use of ball studs which enable an easy releasable connection e.g., to external struts of a given external device and a free rotation of respective strut ends around the balls of the ball studs.

Load introduction must generally be designed so as to reduce the bending load on the ball studs, their fixation into the sandwich shell and the sandwich shell itself. Pulling loads acting transversally to the sandwich shell must be reduced to a minimum in order to avoid peeling on respective face sheets or pull-through failures of the fixation of the ball studs within the sandwich shell, as well as to avoid the need of further reinforcement members such as frames in order to reduce an overall bending load on the sandwich shell. These requirements are especially valid for thin sandwich shells or even more for monolithic skins primarily sized for in-plane membrane loadings.

However, fixation of the ball studs within the sandwich shell may require corrosion resistance in combination e.g., with carbon fuselage structures, a detachability of parts prone to wear in operation, and a minimization of assembly parts with the associated cost and weight. In some allocations, it is imperative to avoid fixations protruding from an outer shell surface in order to eliminate any possible interaction with external equipment which might severely jeopardize the functionality of that equipment. This is exemplarily the case when the fixations are allocated at contact surfaces of floatation balloons deployed in ditching scenario, the protruding portions of the fixations being prone to punch the balloons or the balloon straps being likely to get caught by the protruding portions of the fixations. Consequently, it may be convenient to ensure no external exposure of screwed connections.

An illustrative sandwich shell with such ball studs is described in the document US 2008/0213034 A1. The ball stud includes a base having an attachment portion arranged for attachment to the sandwich shell and a ball attached to the base. The base includes the attachment portion and an anchor portion. The attachment portion suitably is a flange. The attachment portion is placed on top of the skin of the sandwich shell or in a counterbored hole such that the attachment portion is approximately flush with the skin. The ball is mounted on a threaded shaft to be screwed into the base perpendicular to the sandwich shell. A hexagonal base is provided between the ball and the threaded shaft to permit engaging the hexagonal base with a tool, such as a wrench, and tightening the ball against the base. However, as the attachment portion must be bonded to the sandwich shell in order to ensure a proper fixation and load transfer, the repairability of such a ball stud is limited. Moreover, the ball protrudes from the sandwich shell and, therefore, represents an obstacle for operations within that surface of the sandwich shell.

Another example of using attachment interfaces for attachment of an external device to a rotary-wing aircraft refers to attachment of so-called ground service devices for securing rotor blades of a multi-blade rotor of a rotary-wing aircraft. More specifically, the rotor blades of a multi-blade rotor of a rotary-wing aircraft are frequently designed to be able of being folded back into a folded position and stowed in a side-by-side orientation in line with the fuselage of the rotary-wing aircraft to reduce the storage volume for air and ship transportability. In the folded position, an external device such as a ground service device must secure the rotor blades to avoid abnormal loading on the respective blade root attachments to the rotor head, and to avoid that moving rotor blades injure people in the vicinity or damage other rotor blades or the airframe, which is especially likely to happen under strong wind conditions.

The external device is usually designed to locally catch the rotor blades and to transfer wind and inertia loads that are being excited on the folded rotor blades into the airframe. As a result, the airframe is generally implemented with corresponding external fixations for the fixation of the external device and adequate structural reinforcements to integrate the external fixations and properly transfer the interface loads.

A wide variety of external devices is known. Most of the known external devices use clamps. A clamp fixes a rotor blade without compression to avoid damage to the rotor blade. Respective clamps are often carried by a pole, which is individually attached to the airframe of the rotary-wing aircraft at dedicated external fixations, which are typically allocated at the top and lateral regions of the airframe. Attaching each pole individually can lead to a considerable mass of external fixations on the airframe, which is especially true when several rotor blades are being folded.

External fixations on airframes of rotary-wing aircrafts are typically characterized by the use of either metallic fittings riveted to monolithic portions of airframe skins, or metallic inserts integrated within sandwich shells which implement the airframe skins. A respective choice is mainly dependent on an application-specific load level.

More particularly, metallic fittings typically incorporate fixation means for attachment of a given external device, such as ball studs, lugs or slotted holes, and are directly riveted onto a monolithic portion of a given airframe skin. Depending on underlying load characteristics, the metallic fitting may be interconnected to backside structural stiffening members, such as frames, beams or intercostals, in order to avoid an excessive transverse loading on the airframe skin.

The metallic inserts, in turn, provide for a fixation of additional brackets or for a direct fixation of the given external device. However, especially when dealing with thin composite sandwich shells which implement respective airframe skins and facing a dominant transverse loading, the use of metallic inserts is rather limited to smaller external loads. In fact, the metallic inserts and their fixation means are typically arranged perpendicular to a given skin or shell surface. As a result, obliquely applied loads may lead to severe local bending loads that reduce the strength of the fixation. By way of example, the loads introduced transversally to the studs by the perpendicular arrangement in the above-described documents would load the stud and the composite sandwich shells by bending which must be counteracted by sufficient thick sections and proper bonding, which may require a larger clamp area and/or metallic materials for the fitting and, therefore, would lead to certain weight penalties.

In addition, as mentioned above the fittings and inserts are generally metallic due to the complexity of loading introduction into the skin or shell. This results, however, in some additional requirements in terms of corrosion resistance and bonding capability.

The document EP 23 315 391.5 describes a ground service device for securing rotor blades of a multi-blade rotor of a rotary-wing aircraft. The ground service device is attachable to the airframe of the rotary-wing aircraft such that lateral loads to the airframe are avoided by employing an isostatic fixation principle using a set of struts connected to the airframe shells via a connecting interface. The connecting interface comprises several receiver mounts that are externally attached to the side shell of the tail boom. Such connection interfaces help to protect the side shells, but the external shape of the side shells is affected as a result. The documents US2005211825A1 and U.S. Pat. No. 4,623,300A were cited.

SUMMARY

It is, therefore, an object of the present disclosure to provide a new rotary-wing aircraft with an attachment interface that is mounted to the airframe skin of the rotary-wing aircraft at an airframe opening and configured for a releasable attachment of an external device. Such an attachment interface should offer an efficient, easy, light, and safe solution for the airframe fixation points whilst offering the capability to entail a smooth external shape with no protruding parts which may jeopardize the function of external equipment.

These objectives are solved by a rotary-wing aircraft. More specifically, the rotary-wing aircraft comprises an airframe with an airframe skin and at least one attachment interface. The airframe skin forms an outer airframe loft line and encloses an airframe inner volume, wherein the airframe skin comprises at least one airframe opening. The at least one attachment interface is mounted to the airframe skin at the airframe opening and configured for a releasable attachment of an external device. The at least one attachment interface comprises an interface cap and a ball stud. The interface cap is provided with a mounting flange that is rigidly attached to the airframe skin and comprises at least one pocket that forms a pocket base. The ball stud comprises a stud shaft and a ball. The ball stud is rigidly attached to the pocket base and extends at least partly into the airframe opening.

Advantageously, the inventive rotary-wing aircraft with the at least one attachment interface effectively introduces oblique strut load into a curved shell contour, i.e., the airframe skin, while allowing the use of composite materials and minimizing the weight and complexity of the fixation. More specifically, such an attachment interface provides for an efficient load introduction into sandwich or even monolithic shells without the need of further reinforcements as well as for the possibility to eliminate protruding portions of the fixation.

In an illustrative realization, at least one releasable external strut of a suitable ground service device for securing rotor blades of a multi-blade rotor of a rotary-wing aircraft may be connected to the airframe at the attachment interface. More specifically, the attachment interface may be composed of the interface cap and a threaded ball stud. The external strut may comprise a corresponding rod-end which clamps the ball of the ball stud, the clamping being able to be released for detaching the rod-end from the ball stud. As such, the strut is used to attach the ground service device to the attachment interface. While the ground service device is preferably used with the attachment interface to secure the folded-back main rotor blades for an air or ship transportation, the present attachment interface of the rotary-wing aircraft can also be used together with any other external equipment releasably attached to the airframe.

Illustratively, the interface cap comprises the pocket which, in a preferred illustrative realization, penetrates an inner airframe perimeter that is delimited by the loft contour of the side shell. In other words, the pocket is an intruding pocket of the interface cap and extends through the airframe opening into the airframe inner volume that is enclosed by the outer airframe loft line formed by the airframe skin. By way of example, the pocket forms the pocket base which is clamped by screwing the threaded ball stud by means of a nut thereto and which is allocated inside a fuselage within the airframe inner volume. If desired, a protective means is further implemented on the inner surface of the pocket in order to reduce the wear, damage, and impact risk on the interface cap during the installation of the external device, such as the strut.

In an illustrative realization, at least half of the ball of the ball stud is housed within the pocket that is in the airframe inner volume, the ball, hence, protruding from the fuselage by half its diameter at maximum. If desired, the ball stud is fully underneath the outer airframe loft line. That is, the ball stud is completely housed in the airframe inner volume.

Advantageously, the interface cap with the pocket intruding into the airframe inner perimeter allows the ball stud to be partially or even totally hidden within the pocket and not to protrude from the fuselage shell loft perimeter. The attachment interface, thus, does not interfere with external equipment, especially in the scenario of the attachment interface being allocated within e.g., the perimeter of emergency floatation balloons. More specifically, the attachment interface does not have any interaction with such floatation balloons and their fixation strips during unfolding of the floatation balloons and after they are fully deployed and in contact to the fuselage shell surface. As such, there is no need of additional protective covers around protruding portions of the attachment interface to ensure a smooth balloon contact surface.

Furthermore, as the screwed connection of the ball stud with the pocket base is allocated within the fuselage compartment, the nut, which might be prone to corrosion, is not accessible nor visible to the outside. Moreover, additional securing means for the ball stud can be easily implemented within the nut perimeter with no impact to the outside.

In another illustrative realization, the pocket illustratively protrudes from the outer airframe loft line to the outside perimeter of the airframe that is delimited by the loft contour of the side shell. In other words, the pocket is a protruding pocket that is arranged outside of the airframe inner volume. Illustratively, the ball of the ball stud is entirely outside the loft perimeter and the fixation nut is housed within the protruding pocket.

In yet another illustrative realization, the pocket partially protrudes from the outer airframe loft line to the outside perimeter of the airframe that is delimited by the loft contour of the side shell and partially penetrates the cabin perimeter. In other words, the interface cap includes one intruding pocket and one protruding pocket, wherein the ball of the ball stud is entirely outside the loft perimeter and the fixation nut is housed within the protruding pocket.

Advantageously, having an at least partially protruding pocket outside the airframe loft perimeter may ease the accessibility to the ball during the installation of the external device, such as the strut, and reduce the risk of damage to the interface cap and the fuselage shell during such insertion process.

In an illustrative realization, the interface cap is riveted to the side shell of the helicopter at corresponding mounting flanges, the flanges being arranged outside the fuselage, the installation of the interface cap being, hence, performed from the outside of the fuselage. More specifically, the mounting flanges of the interface cap are illustratively connecting the side shell skin all around the perimeter of the pocket and on the outside of the fuselage, the cap, hence, protecting the edges of the associated cut-out, i.e., the airframe opening, of the side shell. In case of severe damage, the interface cap can easily be detached from the shell. The monolithic side shell skin that is connected to the cap preferably results from a local ramp-down of sandwich area of a sandwich shell, i.e., the sandwich shell which implements the airframe skin, into a pure monolithic area in order to allow for an easy mechanical fastening principle.

In an illustrative realization, the interface cap is made of composite material, using thermoset or thermoplastic resins, continuous or discontinuous fibers, prepregs, prepreg chips or short fibers. Advantageously, the interface cap offers a special suitability to be designed as a carbon composite part and, more particularly, as a compression molded part, hence, leading to a very cost-efficient, light part which is non-corrosive in combination with carbon airframes.

When installing an external device, such as the ground service device with struts, to the interface cap, the axis of the ball stud is preferably aligned with the strut axis of the strut. As such, there is no bending moment at the screw and pocket base of the interface cap when the strut is loaded. This is particularly advantageous if the interface cap is manufactured with composite materials.

In an illustrative realization, the orientation of the strut axis and the axis of the ball stud is predominantly tangent to the fuselage shell, which means the angle between the axis of the ball stud and the surface normal of the fuselage shell, aligned at the intersection point between the axis of the ball stud and loft line, differs by more than 45°, preferably by more than 60°. This advantageously avoids an excessive transversal (i.e., out-of-plane) loading of the fuselage shell and the associated pull loads on the fasteners connecting the interface cap to the fuselage shell. Furthermore, the geometry of the interface cap described above is perfectly adapted to spread the load introduced on the ball stud to the fuselage shell.

According to some aspects, the at least one pocket comprises an intruding pocket that extends through the airframe opening into the airframe inner volume.

According to some aspects, the pocket base is arranged inside of the airframe inner volume.

According to some aspects, the ball of the ball stud crosses the outer airframe loft line.

Preferably, maximally half of the ball of the ball stud extends outside of the airframe inner volume and the outer airframe loft line.

According to some aspects, the at least one pocket further comprises a protruding pocket that is arranged outside of the airframe inner volume and the outer airframe loft line.

Preferably, the pocket base connects the intruding pocket with the protruding pocket such that the pocket base crosses the outer airframe loft line.

According to some aspects, the at least one pocket comprises a protruding pocket that is arranged outside of the airframe inner volume.

According to some aspects, the pocket base is arranged outside of the airframe inner volume.

According to some aspects, the stud shaft of the ball stud crosses the outer airframe loft line.

According to some aspects, a stud axis is associated with the ball stud, wherein a loft line normal is associated with the outer airframe loft line at an intersection point of the stud axis with the outer airframe loft line, and wherein the stud axis is inclined relative to the loft line normal by an inclination angle of at least 45°.

Preferably, the stud axis is inclined relative to the loft line normal by an inclination angle of at least 60°.

According to some aspects, the ball stud is detachably clamped at the pocket base using an associated fastener which is attached to the stud shaft.

Preferably, the ball stud is detachably clamped at the pocket base using a nut which is attached to the stud shaft.

According to some aspects, the interface cap comprises composite material and is manufactured using thermoset or thermoplastic resins, continuous or discontinuous fibers, prepregs, prepreg chips, or short fibers.

According to some aspects, the external device is an external ground service device, wherein the ball of the ball stud is provided to build a ball joint with a ball accommodation of a strut of the external ground service device.

According to some aspects, the airframe comprises a fuselage forming a rear fuselage which is connected to a tail boom, wherein a plurality of attachment interfaces is provided at the rear fuselage and/or the tail boom.

BRIEF DESCRIPTION OF DRAWINGS

Embodiments are outlined by way of example in the following description with reference to the attached drawings. In these attached drawings, identical or identically functioning components or elements are labeled with identical reference numbers and characters and are, consequently, only described once in the following description.

DETAILED DESCRIPTION

Figure 1:
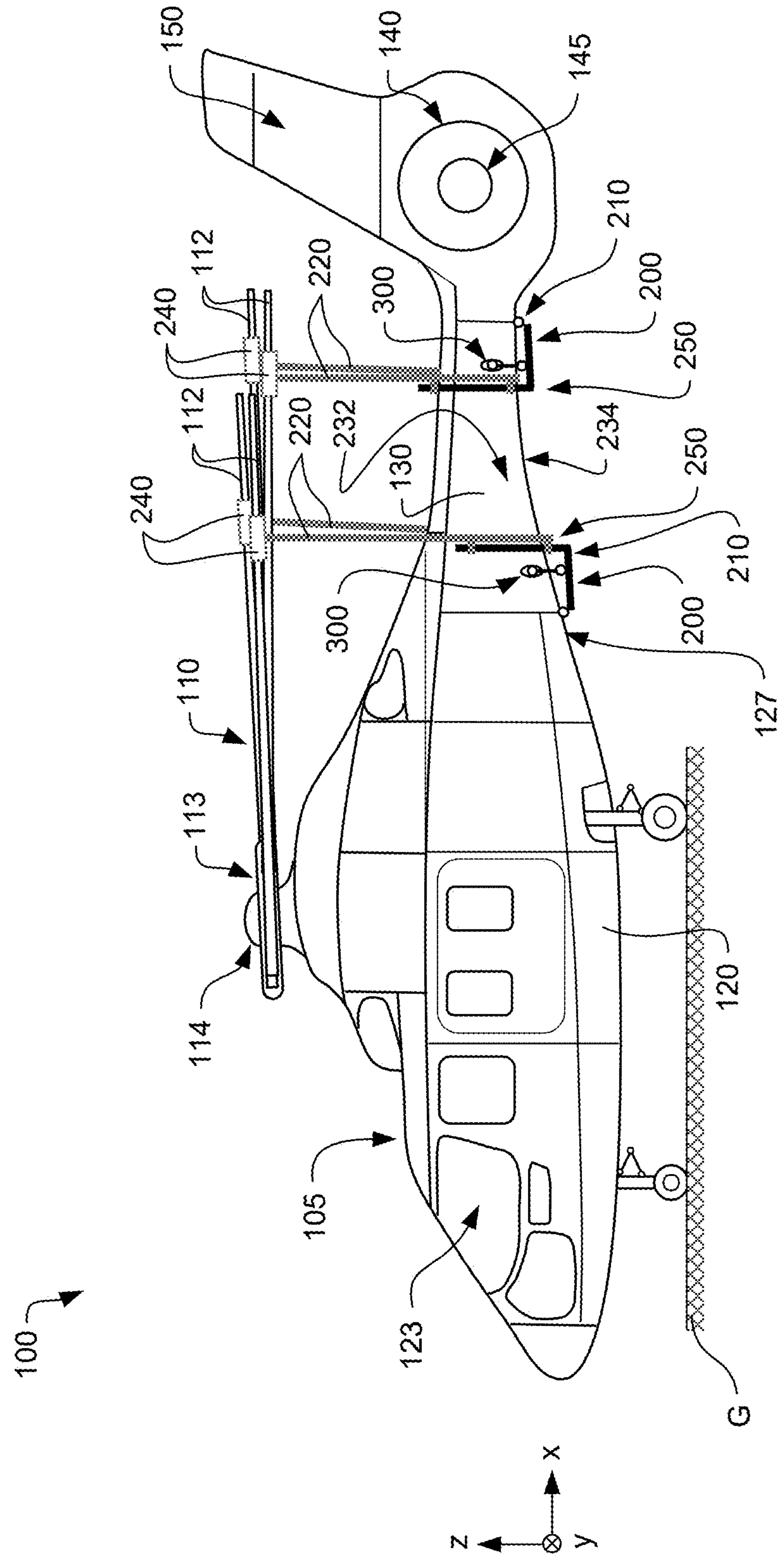
FIG. 1 is a side view of an illustrative rotary-wing aircraft in a non-operational mode, wherein an illustrative ground service system with an illustrative ground service device secures rotor blades of a multi-blade rotor of the rotary-wing aircraft.

FIG. 1 shows an illustrative rotary-wing aircraft 100 in a non-operational mode on ground G with a main rotor 110 which is, by way of example, embodied as a multi-blade rotor. The rotary-wing aircraft 100, which is sometimes also referred to as rotorcraft 100, is illustrated as a helicopter. Thus, for purposes of simplicity and clarity, the rotorcraft 100 is hereinafter referred to as the "helicopter 100".

Illustratively, the helicopter 100 has an aircraft airframe 105 with a fuselage 120. The aircraft airframe 105 and the fuselage 120 illustratively comprise an extension in length direction, an extension in width direction, and an extension in height direction. The length direction is along a longitudinal axis, which is illustratively indicated by an x-axis. The height direction is along a vertical axis that is perpendicular to the longitudinal axis and illustratively indicated by a z-axis. The width direction is along a transversal axis that is perpendicular to the longitudinal axis and the vertical axis and illustratively indicated by a y-axis. Preferably, the fuselage 120 is connected to a suitable landing gear and illustratively forms a cabin 123 and a rear fuselage 127. The rear fuselage 127 is connected to a tail boom 130.

By way of example, the helicopter 100 includes at least one counter-torque device 140 configured to provide counter-torque during operation, i.e., to counter the torque created by rotation of the multi-blade rotor 110 for purposes of balancing the helicopter 100 in terms of yaw. If desired, the counter-torque device 140 may be shrouded.

The at least one counter-torque device 140 is illustratively provided at an aft section of the tail boom 130 and may have a tail rotor 145. The aft section of the tail boom 130 may include a fin 150.

Illustratively, the multi-blade rotor 110 provides lift and forward or backward thrust during operation. The multi-blade rotor 110 comprises a plurality of rotor blades 112 that are mounted at an associated rotor head 114 to a rotor hub 113.

In some scenarios, the rotor blades 112 may be folded. For example, when the helicopter 100 is stowed in a hangar or in a hangar deck of a ship such as a helicopter carrier or an aircraft carrier, the rotor blades 112 of the multi-blade rotor 110 are often folded to allow for a denser stowage.

When the rotor blades 112 are folded, they stand nearly perpendicular to their pitch rotation axis, and gravity force or heavy weather conditions could cause abnormal loading on the rotor blade root that would result in serious damage on the rotor blade attachment.

Therefore, the rotor blades 112 need to be secured to prevent abnormal loading on the blade root attachment to the rotor head 114, and to avoid that the rotor blades 112 hit each other, the fuselage 120, or the tail boom 130, when the rotor blades 112 are folded.

In FIG. 1, the rotor blades 112 of the multi-blade rotor 110, which is illustratively parked in the non-operational mode on the ground G, are, by way of example, in a rearward folded position in line with the extension of the fuselage 120 in the length direction (i.e., along the x-axis). In some implementations, each one of the rotor blades 112 may be secured in the rearward folded position using e.g., an associated ground service system 250. In other implementations, more than two rotor blades 112 may be secured by a common ground service system 250.

By way of example, each illustrative ground service system 250 includes a ground service device 200 and an attachment interface 300. A first ground service device 200 is attached to the rear fuselage 127, and a second ground service device 200 is attached to the tail boom 130. Each ground service device 200 includes a rack 210 that is releasably attached to one of the attachment interfaces 300, which are illustratively arranged on a lower shell 234 and side shells 232 of the rear fuselage 127 and the tail boom 130.

Each ground service device 200 further includes clamps 240 that are attached to the rack 210. The clamps 240 hold the rotor blades 112, thereby releasably connecting the rotor blades 112 with the respective attachment interfaces 300.

Illustratively, each ground service device 200 may include support arms 220. The support arms 220 may connect the clamps 240 with the rack 210. As shown in FIG. 1, each ground service device 200 includes two support arms 220, one support arm 220 on each side of the fuselage 120. Each rotor blade 112 is secured by a separate clamp 240, and each clamp 240 is attached to a separate support arm 220. If desired, a clamp 240 may secure more than one rotor blade 112 and/or more than one clamp 240 may be attached to a support arm 220.

Figure 2:
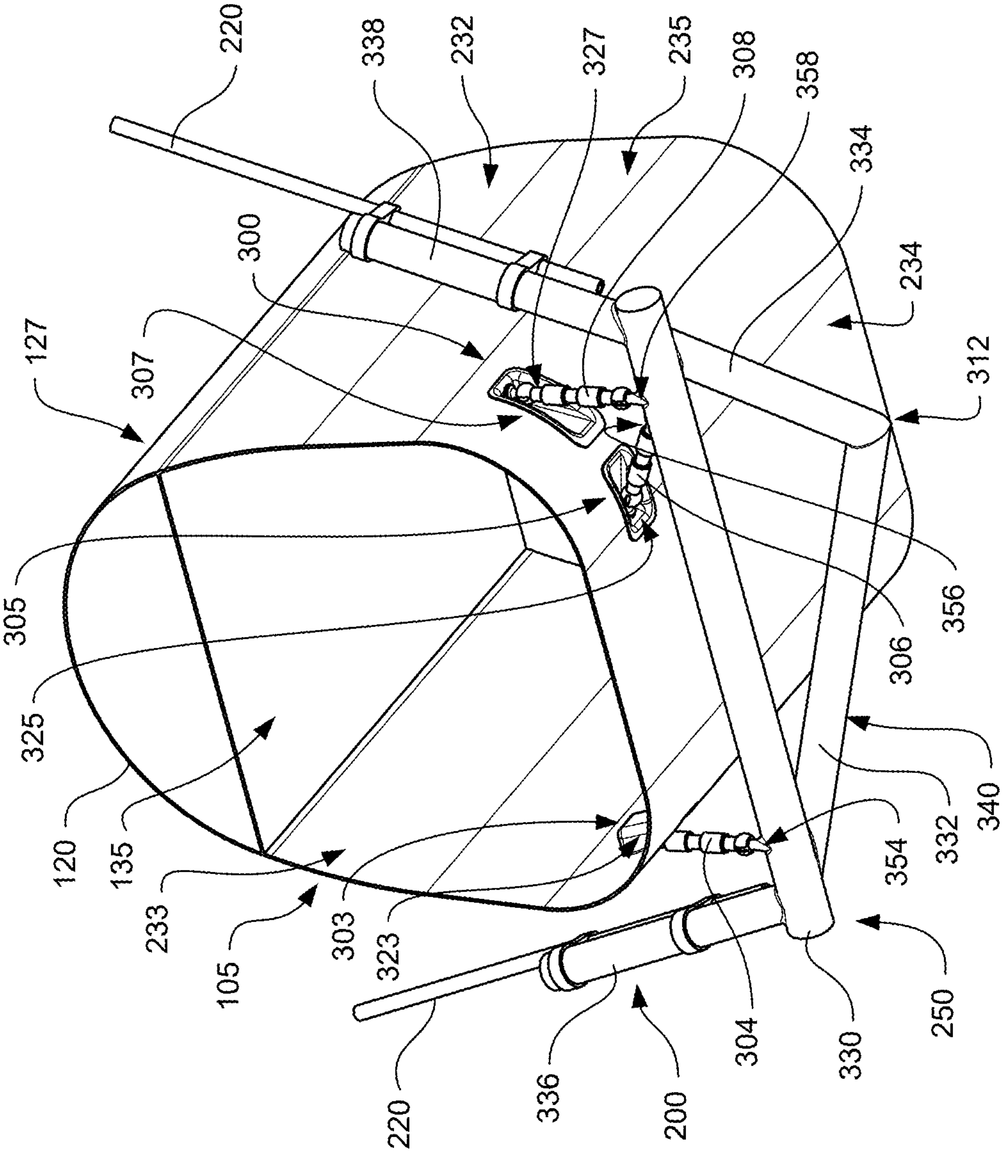
FIG. 2 is a perspective view of an illustrative ground service device that is installed to attachment interfaces of the rotary-wing aircraft.

FIG. 2 shows the ground service system 250 of FIG. 1 with the ground service device 200 that is mounted to associated attachment interfaces 300 provided on the aircraft airframe 105 of the helicopter 100 of FIG. 1 and, more specifically, on the lower shell 234 and the side shells 232 of the rear fuselage 127 of the fuselage 120 of FIG. 1. The ground service system 250 comprises the ground service device 200 of FIG. 1 which includes the two support arms 220, one support arm 220 on each side of the fuselage 120.

As illustrated in FIG. 2, the ground service device 200 is external to the fuselage 120 and, thus, to the helicopter 100 of FIG. 1. Accordingly, the ground service device 200 forms an external device relative to the helicopter 100 and may, thus, also be referred to as the "external device" or the "external ground service device 200" hereinafter.

As shown in FIG. 2, the external ground service device 200 includes a rack base 340, first, second, and third struts 304, 306, 308, and an additional attachment interface 312. The first, second, and third struts 304, 306, 308 are releasably attachable to the attachment interfaces 300, namely to first, second, and third attachment interfaces 303, 305, 307.

The first strut 304 is pivotally attached to the rack base 340 and adapted for releasably attaching the rack base 340 with the first attachment interface 303. The second strut 306 is pivotally attached to the rack base 340 and adapted for releasably attaching the rack base 340 with the second attachment interface 305. The third strut 308 is pivotally attached to the rack base 340 and adapted for releasably attaching the rack base 340 with the third attachment interface 307.

By way of example, the first and third attachment interfaces 303, 307 are allocated at the side shell 232, and the first and third struts 304, 308 that are associated with the first and third attachment interfaces 303, 307 may be essentially oriented in vertical direction (i.e., in direction of the z-axis of FIG. 1). The second attachment interface 305 is allocated at the lower shell 234, and the second strut 306 that is associated with the second attachment interface 305 may be essentially oriented in transversal direction (i.e., in direction of the y-axis of FIG. 1).

Illustratively, the rack base 340 includes a main beam 330 and first and second diagonal beams 332, 334. In some implementations, the first and second diagonal beams 332, 334 may have the same length. In other implementations the first and second diagonal beams 332, 334 may have a different length.

The main beam 330 and the first and second diagonal beams 332, 334 may form a triangle. If desired, the first and second diagonal beams 332, 334 connect with the main beam 330 at its outermost perimeter.

In some implementations, when installed on the helicopter 100 of FIG. 1, the first and second diagonal beams 332, 334 may extend from the main beam 330 in longitudinal direction (i.e., in direction of the x-axis of FIG. 1) towards the aft of the helicopter 100. In other implementations, when installed on the helicopter 100, the first and second diagonal beams 332, 334 may extend in longitudinal direction from the main beam 330 towards the front of the helicopter 100.

By way of example, the rack base 340 may include first and second lateral beams 336, 338. As shown in FIG. 2, the first and second lateral beams 336, 338 are fixedly attached to the main beam 330. If desired, the support arms 220 may be attached to the lateral beams 336, 338. Thus, the first and second lateral beams 336, 338 may connect the support arms 220 with the main beam 330.

By way of example, the additional attachment interface 312 may be fixedly attached to the rack base 340 at an intersection of the first and second diagonal beams 332, 334. In some implementations, the first, second, and third struts 304, 306, 308 may be pivotally attached to the rack base 340 at respective strut-rack attachments 354, 356, 358. For example, the first and third struts 304, 308 may be pivotally attached to the main beam 330, and the second strut 306 may be pivotally attached to one of the lateral beams 336, 338. As shown in FIG. 2, the second strut 306 is pivotally attached to the second lateral beam 338 (the corresponding strut-rack attachment 356 is partially blocked by the main beam 330). However, the second strut 306 may be pivotally attached to the first lateral beam 336 instead, if desired.

Illustratively, the first strut 304, the second strut 306, and the third strut 308 are pivotally attached to the rack base 340 by at least one of a ball joint, a spherical bearing, or a universal joint. As an example, the ball of a ball joint may be fixedly attached to the rack base 340, and the socket of the ball joint may be part of the respective strut 304, 306, 308. As another example, the socket of a ball joint may be fixedly attached to the rack base 340, and the ball of the ball joint may be part of the respective strut 304, 306, 308. In both examples, the first, second and third struts 304, 306, 308 may pivot at the respective strut-rack attachments 354, 356, 358.

According to the present disclosure, the first attachment interface 303 includes a first interface cap 323 that is adapted for releasably receiving the first strut 304, the second attachment interface 305 includes a second interface cap 325 that is adapted for releasably receiving the second strut 306, and the third attachment interface 307 includes a third interface cap 327 that is adapted for releasably receiving the third strut 308. Illustratively, the first interface cap 323 and the third interface cap 327 may be fastened to the side shell 232 from an outer side 235 of the side shell 232, and the second interface cap 325 may be fastened to the lower shell 234 from an outer side of the lower shell 234. More specifically, the first, second, and third interface caps 323, 325, 327 may protrude from the outside inwardly to an inner side 233 of the side shell 232 and an inner side of the lower shell 234 and intrude into an airframe inner volume 135 provided within the airframe 105.

The first, second, and third attachment interfaces 303, 305, 307 may all have substantially identical structures and be oriented in different directions according to the specific needs of their allocated position. Thus, for simplicity and clarity, the third attachment interface 307 will be described in detail below representatively for all attachment interfaces 300.

FIG. 3 to FIG. 8 show a section of the aircraft airframe 105 of FIG. 2 and, more particularly, of the fuselage 120 together with the attachment interface 307 that comprises the interface cap 327 of FIG. 2. The attachment interface 307 is mounted to the side shell 232 of the rear fuselage 127 of the helicopter 100 of FIG. 1 and further illustrated and described in each one of FIG. 3 to FIG. 8 representative for all attachment interfaces 300 of FIG. 1 and FIG. 2, such as the attachment interfaces 303, 305 of FIG. 2. Accordingly, the configuration and construction of the attachment interface 307 as well as the interface cap 327 are likewise applicable to the attachment interface 303 with the interface cap 323 of FIG. 2, and to the attachment interface 305 with the interface cap 325 of FIG. 2.

Figure 3:
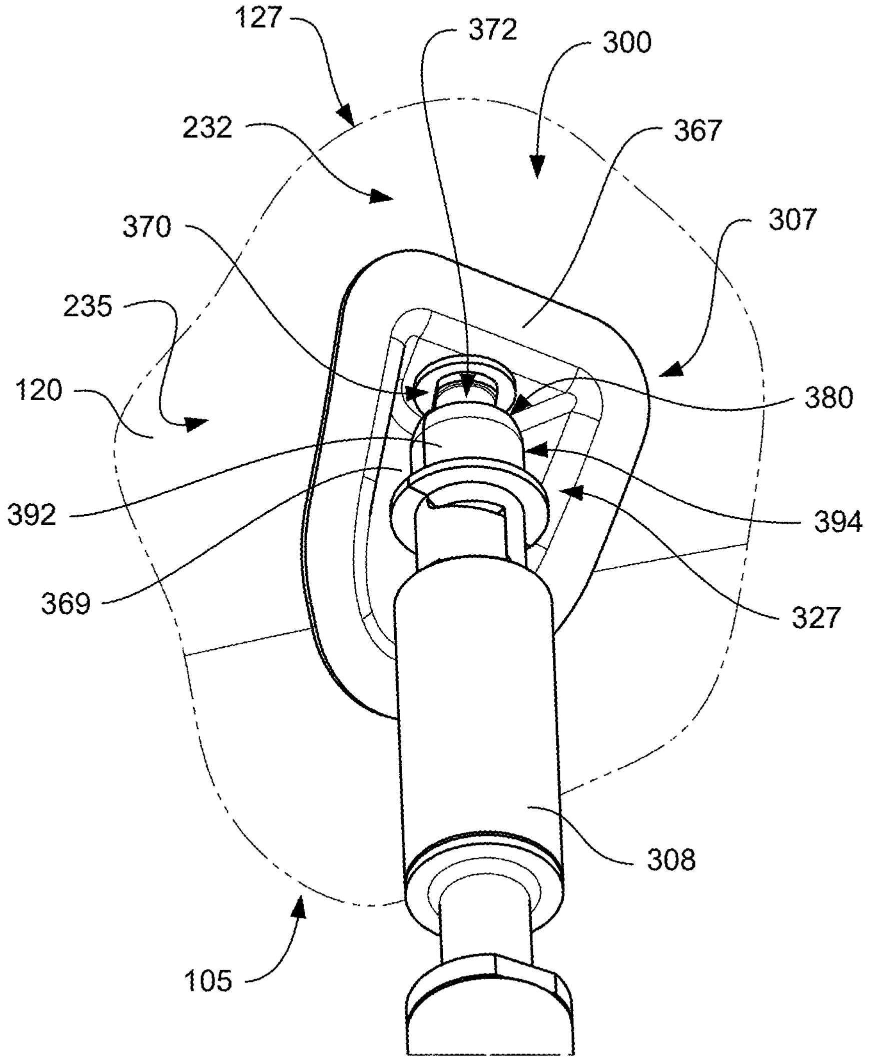
FIG. 3 is an enlarged view of the attachment interface of FIG. 2 allocated on a side shell of the rotary-wing aircraft and attached to a strut of the ground service device.

FIG. 3 shows the attachment interface 307 with the interface cap 327 of FIG. 2, which is preferably a thin-walled component. The interface cap 327 comprises a mounting flange 367 that is illustratively rigidly attached to the side shell 232 of the fuselage 120. Moreover, the interface cap 327 comprises at least one pocket 369 and may be formed with the mounting flange 367 as a one-piece element, i.e., the mounting flange 367 may be an integral part of the interface cap 327.

Illustratively, the mounting flange 367 is rigidly attached to the outer side 235 of the side shell 232 of the rear fuselage 127 of FIG. 2. For instance, the mounting flange 367 may be riveted to the outer side 235 of the side shell 232. However, fastening of the mounting flange 367 of the attachment interface 307 to the outer side 235 of the side shell 232 may also be done by bonding or using screws or any other type of fastener that is suitable therefore.

The attachment interface 307 further comprises a ball stud 370 with a ball 372, which is rigidly attached to a pocket base 399 of the pocket 369 of the interface cap 327.

Figure 5:
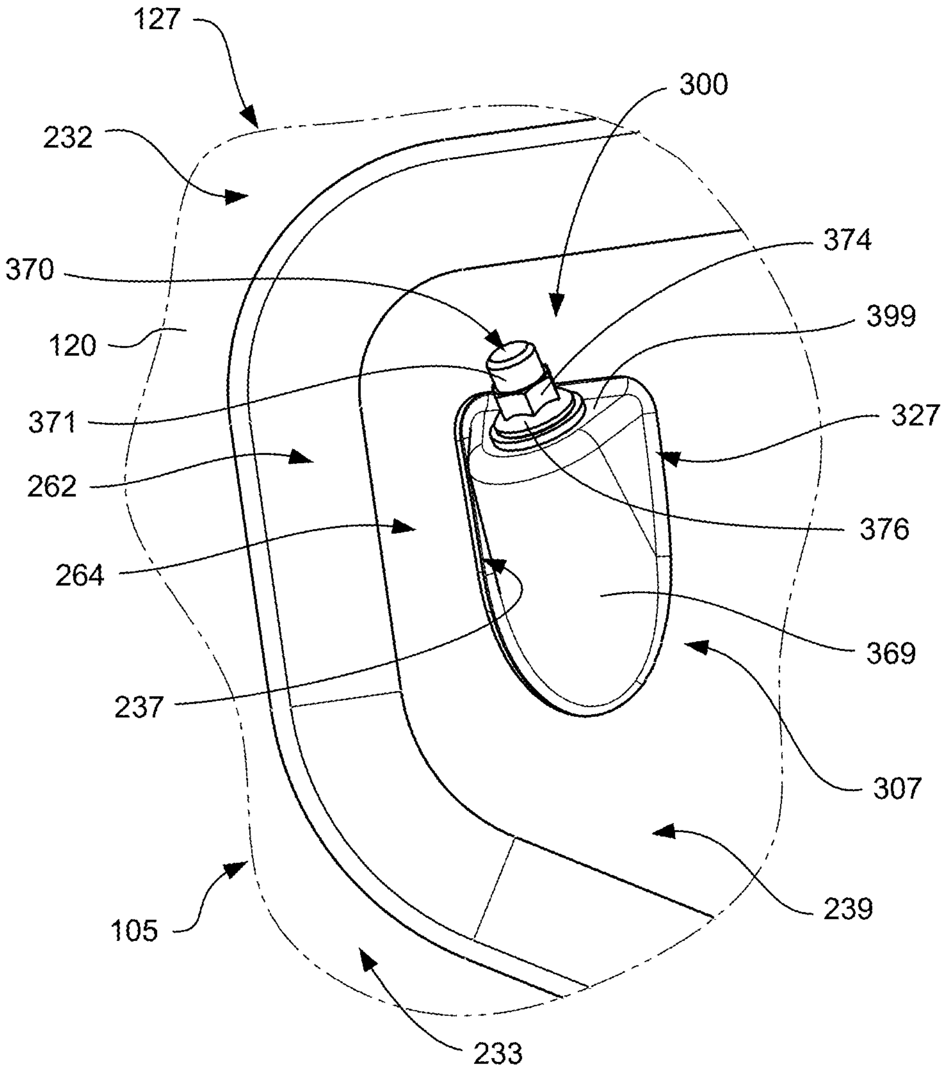
FIG. 5 is a further enlarged view of the attachment interface of FIG. 3, which is viewed from inside the side shell.
Figure 6:
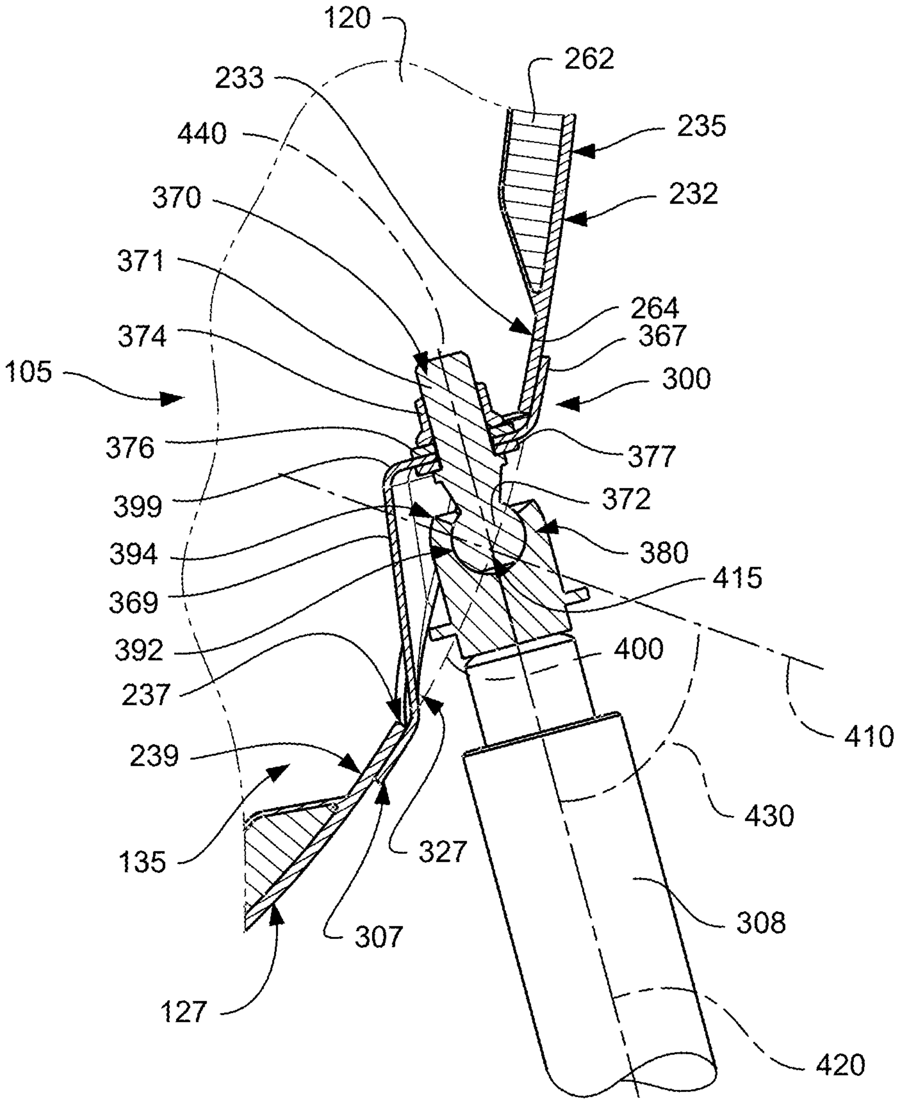
FIG. 6 is a cross-sectional view of the attachment interface of FIG. 3 connected to the side shell of FIG. 3 and attached to the strut of FIG. 3 according to one embodiment of the present disclosure.
Figure 7:
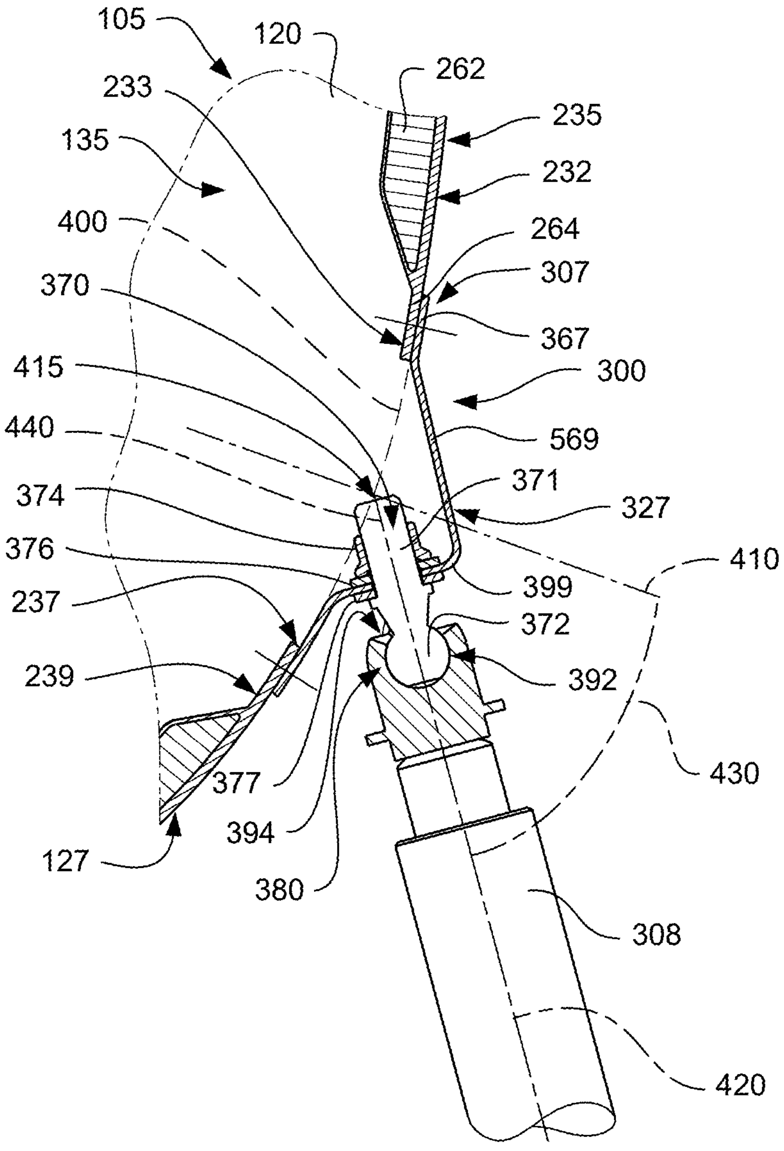
FIG. 7 is a cross-sectional view of the attachment interface of FIG. 3 allocated on the side shell of FIG. 3 and attached to the strut of FIG. 3 according to another embodiment of the present disclosure.
Figure 8:
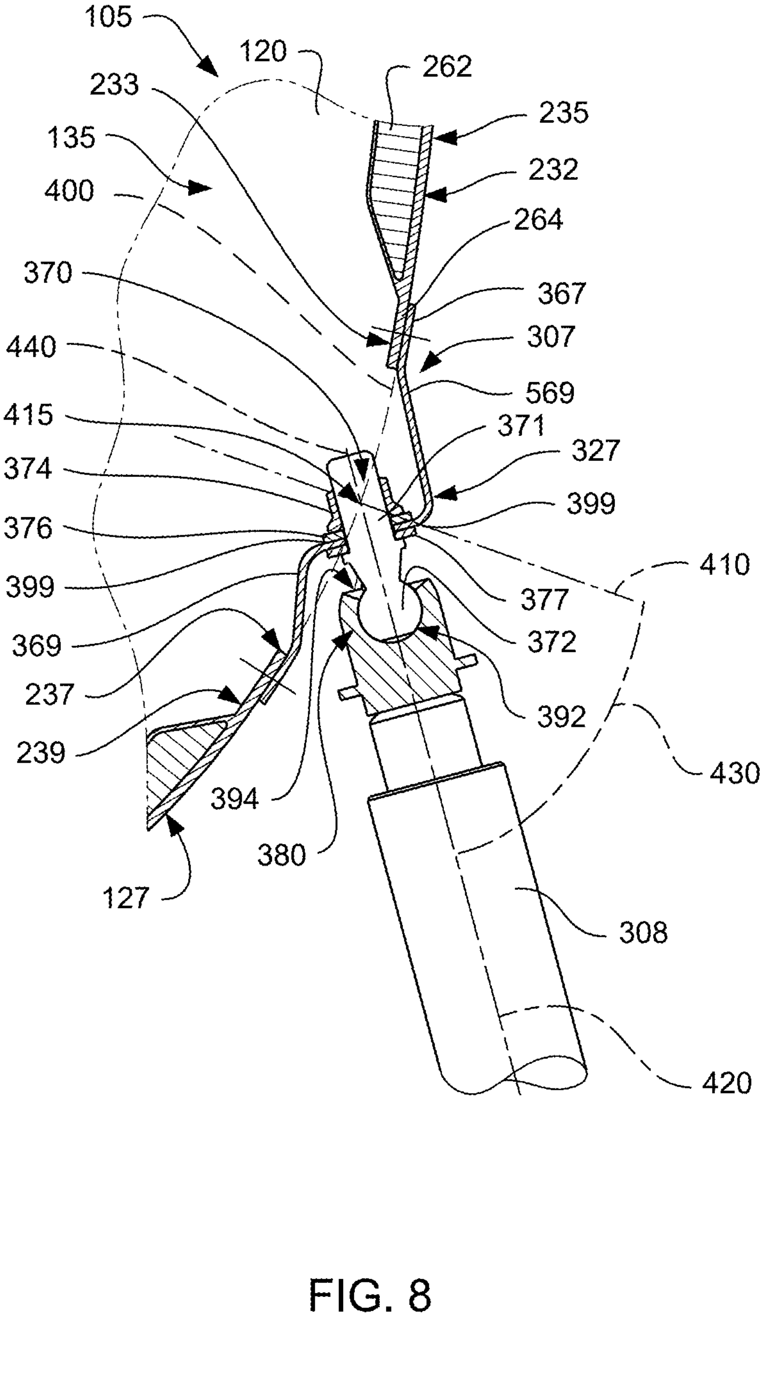
FIG. 8 is a cross-sectional view of the attachment interface of FIG. 3 allocated on the side shell of FIG. 3 and attached to the strut of FIG. 3 according to yet another embodiment of the present disclosure.

Accordingly, the ball stud 370 extends at least partly into an airframe opening (i.e., airframe opening 237 in FIG. 5), as illustrated in greater detail in FIG. 6 to FIG. 8. By way of example, the ball 372 of the ball stud 370 forms a ball joint 380 with a ball accommodation 392 of the strut 308 of the external ground service device 200 of FIG. 2.

Figure 4:
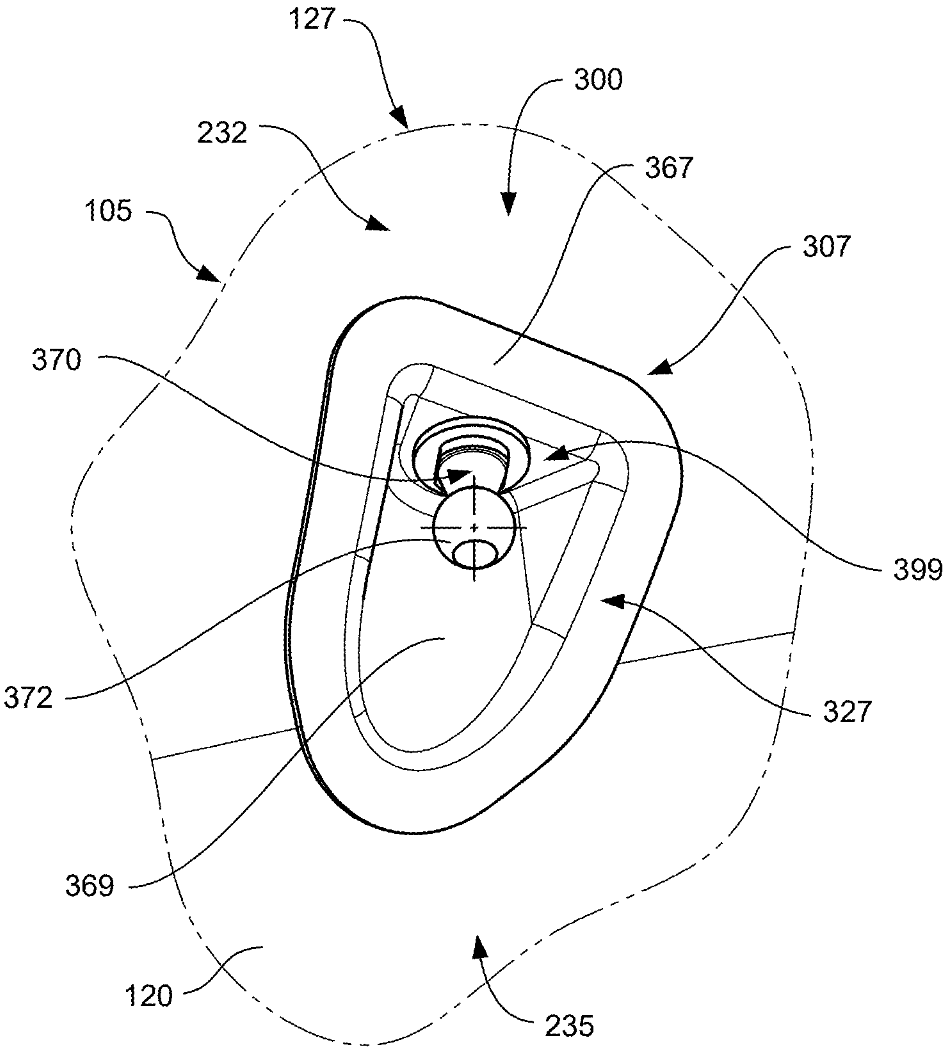
FIG. 4 is a further enlarged view of the attachment interface of FIG. 3, which is shown without the strut.

FIG. 4 shows the attachment interface 307 with the interface cap 327 of FIG. 2 and FIG. 3 which is rigidly attached to the outer side 235 of the side shell 232 of the rear fuselage 127 of the fuselage 120 according to FIG. 3. However, in contrast to FIG. 3 the attachment interface 307 is now shown without being connected to the strut 308 of FIG. 3 for further illustrating the ball stud 370 with the ball 372 as well as the pocket 369 with the pocket base 399 of FIG. 3.

Illustratively, the pocket 369 of the interface cap 327 is an intruding pocket 369 that extends through an airframe opening (237 in FIG. 5) into the airframe inner volume 135 of the fuselage 120 of FIG. 2. The ball stud 370 is rigidly attached to the pocket base 399 of the pocket 369 such that the ball 372 of the ball stud 370 is, by way of example, at least essentially housed within the pocket 369.

FIG. 5 shows the attachment interface 307 with the interface cap 327 of FIG. 2 to FIG. 4 which is rigidly attached to the side shell 232 of the rear fuselage 127 of the fuselage 120 according to FIG. 3 and FIG. 4. However, in contrast to FIG. 3 and FIG. 4 the attachment interface 307 is now seen from inside of the fuselage 120 in direction of the inner side 233 of the side shell 232 of the rear fuselage 127.

More specifically, the side shell 232 illustratively comprises an airframe skin 239. In some implementations, the side shell 232 and, more particularly, the airframe skin 239 may comprise a side shell sandwich region 262 which is ramped down into a side shell monolithic region 264 to facilitate an easy fixation of the interface cap 327 to the side shell 232.

The airframe skin 239 comprises at least one airframe opening 237. The airframe opening 237 is illustratively formed in the side shell monolithic region 264. The attachment interface 307 is mounted to the airframe skin 239 at the airframe opening 237. More specifically, the mounting flange 367 of the interface cap 327 is rigidly attached to the airframe skin 239 and, preferably, to the side shell monolithic region 264.

FIG. 5 also further illustrates the ball stud 370 which, in addition to the ball 372 of FIG. 3 and FIG. 4, includes a stud shaft 371. The stud shaft 371 is preferably integrally formed with the ball 372 of FIG. 3 and FIG. 4 in one piece.

As described above at FIG. 4, the ball stud 370 is rigidly attached to the pocket base 399 of the pocket 369 of FIG. 3 and FIG. 4. Illustratively, the ball stud 370 is detachably clamped at the pocket base 399 using an associated fastener 374, in particular a nut, which is attached to the stud shaft 371. A washer 376 is illustratively positioned between the nut 374 and the pocket base 399.

FIG. 6 shows the attachment interface 307 with the interface cap 327 of FIG. 2 to FIG. 5 which is rigidly attached to the side shell 232 of the rear fuselage 127 of the fuselage 120 according to FIG. 3 to FIG. 5. More specifically, the mounting flange 367 of the interface cap 327 of the attachment interface 307 is rigidly attached to the airframe skin 239 at the side shell monolithic region 264. The ball stud 370 of FIG. 2 to FIG. 5 comprises the stud shaft 371 and the ball 372 and is rigidly attached to the pocket base 399 of the pocket 369 of the interface cap 327 of FIG. 3 to FIG. 5.

As illustrated in greater detail in FIG. 6, the fuselage 120 and, more generally, the aircraft airframe 105 of FIG. 2 to FIG. 5 comprises the airframe skin 239 that encloses the airframe inner volume 135 according to FIG. 2 and that comprises the at least one airframe opening 237 of FIG. 5. Illustratively, the airframe skin 239 forms an outer airframe loft line 400. According to FIG. 5 the airframe skin 239 comprises the side shell sandwich region 262 which is ramped down into the side shell monolithic region 264, which forms the at least one airframe opening 237.

According to the present disclosure, the ball stud 370 extends at least partly into the airframe opening 237. Furthermore, by way of example, the pocket 369 is an intruding pocket 369 that extends through the airframe opening 237 into the airframe inner volume 135. Accordingly, the pocket base 399 is arranged inside of the airframe inner volume 135.

Illustratively, the stud shaft 371 of the ball stud 370 is attached to the pocket base 399 of the pocket 369 of the interface cap 327, as described above at FIG. 5 such that the ball 372 of the ball stud 370 crosses the outer airframe loft line 400. Preferably, maximally half of the ball 372 of the ball stud 370 extends outside of the airframe inner volume 135 and the outer airframe loft line 400. By way of example, the outer airframe loft line 400 divides the ball 372 into two portions, wherein the volume of one portion of the ball 372 located inside the airframe inner volume 135 is greater than or equal to the volume of the other portion of the ball 372 located outside the airframe inner volume 135. If desired, the ball stud 370 is arranged fully underneath the outer airframe loft line 400 such that the ball 372 of the ball stud 370 may be entirely hidden within the intruding pocket 369 within the perimeter of the outer airframe loft line 400.

Moreover, as described at FIG. 5 the ball stud 370 is preferably detachably clamped at the pocket base 399 using an associated fastener 374 which is attached to the stud shaft 371. The fastener 374 is illustrated as the nut which is attached to the stud shaft 371. The washer 376 is positioned between the nut 374 and the inner side of the pocket base 399, while an additional washer 377 is positioned at the outer side of the pocket base 399 facing the ball 372 of the ball stud 370.

Illustratively, a stud axis 440 is associated with the ball stud 370. Furthermore, a loft line normal 410 is associated with the outer airframe loft line 400 at an intersection point 415 of the stud axis 440 with the outer airframe loft line 400. The stud axis 440 is preferably inclined relative to the loft line normal 410 by an inclination angle 430 of at least 45°. Alternatively, or preferentially, the stud axis 440 may be inclined relative to the loft line normal 410 by an inclination angle 430 of 60°.

Illustratively, the ball 372 of the ball stud 370 is provided to build the ball joint 380 with the ball accommodation 392 of a strut, e.g., the strut 308 of FIG. 2 and FIG. 3, of the external ground service device 200. By way of example, the upper strut end 394 of the strut 308 is releasably attached to the ball stud 370 at the ball 372. Furthermore, a strut axis 420 is associated with the strut 308 of the ground service device 200. The strut axis 420 is aligned to the stud axis 440. In an illustrative realization, the orientation of the strut axis 420 and the stud axis 440 is perpendicular to the pocket base 399. Illustratively, a reference plane in which the pocket base 399 is located may intersect non-perpendicularly with the normal 410 of the outer airframe loft line 400 of the aircraft airframe 105.

FIG. 7 shows the attachment interface 307 with the interface cap 327 of FIG. 2 to FIG. 6 which is rigidly attached to the side shell 232 of the rear fuselage 127 of the fuselage 120 according to FIG. 3 to FIG. 6. More specifically, the mounting flange 367 of the interface cap 327 of the attachment interface 307 is rigidly attached to the airframe skin 239 at the side shell monolithic region 264. The ball stud 370 of FIG. 2 to FIG. 6 comprises the stud shaft 371 and the ball 372 and is rigidly attached to the pocket base 399 of the interface cap 327 of FIG. 3 to FIG. 5. Furthermore, as described above the aircraft airframe 105 comprises the airframe skin 239 that forms the outer airframe loft line 400 and encloses the airframe inner volume 135. The airframe skin 239 illustratively comprises the at least one airframe opening 237.

However, in contrast to FIG. 6, the interface cap 327 now comprises a protruding pocket 569 that is arranged outside of the airframe inner volume 135 and that comprises the pocket base 399 that is likewise arranged outside of the airframe inner volume 135. Thus, preferably at least the ball 372 of the ball stud 370 which is rigidly attached to the pocket base 399 is entirely arranged outside the outer airframe loft line 400. The stud shaft 371 of the ball stud 370, in turn, may cross the outer airframe loft line 400, or not.

FIG. 8 shows the attachment interface 307 with the interface cap 327 of FIG. 2 to FIG. 6 which is rigidly attached to the side shell 232 of the rear fuselage 127 of the fuselage 120 according to FIG. 3 to FIG. 6. More specifically, the mounting flange 367 of the interface cap 327 of the attachment interface 307 is rigidly attached to the airframe skin 239 at the side shell monolithic region 264. The ball stud 370 of FIG. 2 to FIG. 6 comprises the stud shaft 371 and the ball 372 and is rigidly attached to the pocket base 399 of the interface cap 327 of FIG. 3 to FIG. 5. Furthermore, as described above the aircraft airframe 105 comprises the airframe skin 239 that forms the outer airframe loft line 400 and encloses the airframe inner volume 135. The airframe skin 239 illustratively comprises the at least one airframe opening 237.

However, in contrast to FIG. 6, the interface cap 327 now comprises in addition to the at least one pocket 369 of FIG. 6, which is formed as an intruding pocket that extends through the airframe opening 237 into the airframe inner volume 135, the protruding pocket 569 of FIG. 7 which is arranged outside of the airframe inner volume 135 and the outer airframe loft line 400. Illustratively, the pocket base 399 connects the intruding pocket 369 with the protruding pocket 569 such that the pocket base 399 crosses the outer airframe loft line 400. Thus, similar to FIG. 7 the ball 372 of the ball stud 370 is illustratively arranged outside of the outer airframe loft line 400, but in contrast to FIG. 7 closer to the outer side 235 of side shell 232. Again, the stud shaft 371 of the ball stud 370 may cross the outer airframe loft line 400.

It should be noted that the above described embodiments are merely described to illustrate possible embodiments of the present disclosure, but not in order to restrict the present disclosure thereto. Instead, multiple modifications and variations of the above described embodiments are possible and should, therefore, also be considered as being part of the disclosure.

For instance, the strut 306 of FIG. 2 is shown pivotally attached to the second lateral beam 338. However, the strut 306 of FIG. 2 may alternatively be pivotally attached to the first lateral beam 336, instead. Moreover, the ball 372 of the ball stud 370 of FIG. 6 is shown crossing the outer airframe loft line 400. However, the ball 372 of the ball stud 370 of FIG. 6 may also be entirely inside of the airframe inner volume 135, and so on.

Furthermore, as described above at FIG. 2 the first, second, and third attachment interfaces 303, 305, 307 may all have substantially identical structures. Moreover, the first, second, and third attachment interfaces 303, 305, 307 may all provide for similar fixation principles, such as ball joints. However, one or more of the attachment interfaces may alternatively have different structures which may, e.g., be well-known by the person skilled in the art, and/or provide for different fixation principles than the ones described above.

REFERENCE LIST

100 rotary-wing aircraft
105 aircraft airframe
110 multi-blade main rotor
112 rotor blades
113 rotor hub
114 rotor head
120 fuselage
123 cabin
127 rear fuselage
130 tail boom
135 airframe inner volume
140 counter-torque device
145 tail rotor
150 fin
200 external ground service device
210 rack
220 support arms
232 side shell
233 inner side of side shell
234 lower shell
235 outer side of side shell
237 airframe opening
239 airframe skin
240 clamps
250 ground service system
262 side shell sandwich region
264 side shell monolithic region
300 ground service device attachment interfaces
303, 305, 307 attachment interfaces
304, 306, 308 struts
312 additional attachment interface
323, 325, 327 interface caps
330 main beam
332, 334 diagonal beams
336, 338 lateral beams
340 rack base
354, 356, 358 strut-rack attachments
367 interface cap mounting flange
369 intruding pocket
370 ball stud
371 stud shaft
372 ball
374 nut
376, 377 washers
380 ball joint
392 ball accommodation
394 upper strut end
399 inner pocket base
400 outer airframe loft line
410 loft line normal
415 intersection point

420 strut axis
430 inclination angle
440 stud axis
569 protruding pocket
x longitudinal axis
y transversal axis
z vertical axis
G ground

What is claimed is:

1. A rotary-wing aircraft, comprising:

an airframe with an airframe skin that forms an outer airframe loft line and encloses an airframe inner volume, wherein the airframe skin comprises at least one airframe opening; and at least one attachment interface that is mounted to the airframe skin at the airframe opening and configured for a releasable attachment of an external device, wherein the at least one attachment interface comprises:

an interface cap with a mounting flange that is rigidly attached to the airframe skin, wherein the interface cap comprises at least one pocket that forms a pocket base; and a ball stud with a stud shaft and a ball, wherein the ball stud is rigidly attached to the pocket base and extends at least partly into the airframe opening.

2. The rotary-wing aircraft of claim 1, wherein the at least one pocket comprises an intruding pocket that extends through the airframe opening into the airframe inner volume.

3. The rotary-wing aircraft of claim 2, wherein the ball of the ball stud crosses the outer airframe loft line.

4. The rotary-wing aircraft of claim 3, wherein maximally half of the ball of the ball stud extends outside of the airframe inner volume and the outer airframe loft line.

5. The rotary-wing aircraft of claim 2, wherein the at least one pocket further comprises a protruding pocket that is arranged outside of the airframe inner volume and the outer airframe loft line.

6. The rotary-wing aircraft of claim 5, wherein the pocket base connects the intruding pocket with the protruding pocket such that the pocket base crosses the outer airframe loft line.

7. The rotary-wing aircraft of claim 5, wherein the stud shaft of the ball stud crosses the outer airframe loft line.

8. The rotary-wing aircraft of claim 1, wherein the pocket base is arranged inside of the airframe inner volume.

9. The rotary-wing aircraft of claim 1, wherein the at least one pocket comprises a protruding pocket that is arranged outside of the airframe inner volume.

10. The rotary-wing aircraft of claim 1, wherein the pocket base is arranged outside of the airframe inner volume.

11. The rotary-wing aircraft of claim 1, wherein a stud axis is associated with the ball stud, wherein a loft line normal is associated with the outer airframe loft line at an intersection point of the stud axis with the outer airframe loft line, and wherein the stud axis is inclined relative to the loft line normal by an inclination angle of at least 45°.

12. The rotary-wing aircraft of claim 1, wherein the ball stud is detachably clamped at the pocket base using an associated fastener, which is attached to the stud shaft.

13. The rotary-wing aircraft of claim 1, wherein the interface cap comprises composite material and is manufactured using thermoset or thermoplastic resins, continuous or discontinuous fibers, prepregs, prepreg chips, or short fibers.

14. The rotary-wing aircraft of claim 1, wherein the external device is an external ground service device, and wherein the ball of the ball stud is provided to build a ball joint with a ball accommodation of a strut of the external ground service device.

15. The rotary-wing aircraft of claim 1, wherein the airframe comprises a fuselage forming a rear fuselage which is connected to a tail boom, and wherein a plurality of attachment interfaces is provided at the rear fuselage and/or the tail boom.

* * * * *